(12) United States Patent
McNamee

(10) Patent No.: US 7,328,652 B2
(45) Date of Patent: Feb. 12, 2008

(54) APPARATUS AND SYSTEM FOR DISPENSING DOUGH

(75) Inventor: Ronan McNamee, Dartry (IE)

(73) Assignee: Irish Baker Inventions Limited (IR)

( * ) Notice: Subject to any disclaimer, the term of this patent is extended or adjusted under 35 U.S.C. 154(b) by 510 days.

(21) Appl. No.: 10/611,462

(22) Filed: Jun. 30, 2003

(65) Prior Publication Data

US 2004/0028767 A1   Feb. 12, 2004

(30) Foreign Application Priority Data

Jul. 5, 2002   (IE) ............... S2002/0562

(51) Int. Cl.
*A21C 1/00* (2006.01)
(52) U.S. Cl. .............. 99/353; 99/450.2; 366/98; 366/309; 425/208; 425/298
(58) Field of Classification Search .......... 99/352–355, 99/403–407, 386, 443 R, 483, 443 C, 330, 99/477–479, 450.1–450.8; 426/438; 425/298; 425/208; 366/98, 309
See application file for complete search history.

(56) References Cited

U.S. PATENT DOCUMENTS

| | | | | |
|---|---|---|---|---|
| 2,538,937 A | * | 1/1951 | Foster | 99/404 |
| 3,340,792 A | | 9/1967 | Matzke | 99/405 |
| 3,603,243 A | | 9/1971 | Foster | 99/355 |
| 3,757,672 A | | 9/1973 | Szabrak et al. | 99/404 |
| 3,793,937 A | | 2/1974 | Lipoma | 99/355 |
| 3,812,775 A | | 5/1974 | Sijbring | 99/404 |
| 3,819,837 A | | 6/1974 | Keith et al. | 426/27 |
| 4,311,397 A | * | 1/1982 | Wright | 366/98 |
| 4,689,236 A | | 8/1987 | Pinto | 426/502 |
| 4,694,742 A | | 9/1987 | Dover | 99/404 |
| 4,694,743 A | | 9/1987 | Groff | 99/405 |
| 4,835,369 A | * | 5/1989 | Oslin | 219/439 |
| 5,283,074 A | * | 2/1994 | Campbell | 426/496 |
| 5,322,006 A | | 6/1994 | Morioka et al. | 99/405 |
| 5,464,640 A | * | 11/1995 | Dalbon | 426/231 |
| 5,493,956 A | | 2/1996 | Larsen | 99/404 |
| 5,580,598 A | | 12/1996 | Benson et al. | 426/438 |
| 5,630,358 A | | 5/1997 | Patel | 99/349 |
| 5,673,609 A | | 10/1997 | Sanchez et al. | 99/353 |
| 5,727,742 A | * | 3/1998 | Lawson | 241/199.12 |
| 5,988,051 A | | 11/1999 | Hashiguchi et al. | 99/472 |

(Continued)

FOREIGN PATENT DOCUMENTS

DE   2159074   5/1972

(Continued)

OTHER PUBLICATIONS

U.S. Appl. No. 10/611,463, filed Jun. 30, 2003, McNamee.

(Continued)

*Primary Examiner*—Timothy F. Simone
(74) *Attorney, Agent, or Firm*—Baker, Donelson, Bearman, Caldwell & Berkowitz

(57) ABSTRACT

A dough dispensing apparatus (100) comprises a container (1,1') for receiving and holding dough and a dough transfer device (3,3') for receiving dough from the container and for transferring the dough to a depositing station (4,5) at which the dough is deposited onto a conveying means (12) for further processing steps to be carried out on the dough.

35 Claims, 17 Drawing Sheets

U.S. PATENT DOCUMENTS

| | | |
|---|---|---|
| 6,073,540 A | 6/2000 | Garrett .................. 99/330 |
| 6,245,370 B1 | 6/2001 | Pilati et al. .................. 426/289 |
| 6,467,398 B2 | 10/2002 | Fink et al. .................. 99/330 |
| 6,467,401 B2 | 10/2002 | Caridis et al. ................ 99/353 |

FOREIGN PATENT DOCUMENTS

| | | |
|---|---|---|
| DE | 20014175 | 12/2000 |
| EP | 0382105 | 8/1990 |
| EP | 0 903 084 | 3/1999 |
| GB | 767 255 | 1/1957 |
| GB | 2151174 | 7/1985 |
| GB | 0315424.2 | 11/2003 |
| GB | 2 391 222 | 11/2004 |
| IE | 960202 | 10/1996 |
| JP | 5177590 | 7/1993 |

OTHER PUBLICATIONS

U.S. Appl. No. 10/611,469, filed Jun. 30, 2003, McNamee.
Search report GB 0315424.2, Nov. 24, 2003.
Search report GB 0315435.8, Jan. 6, 2004.
Search report GB 0315243.6, Dec. 23, 2003.

* cited by examiner

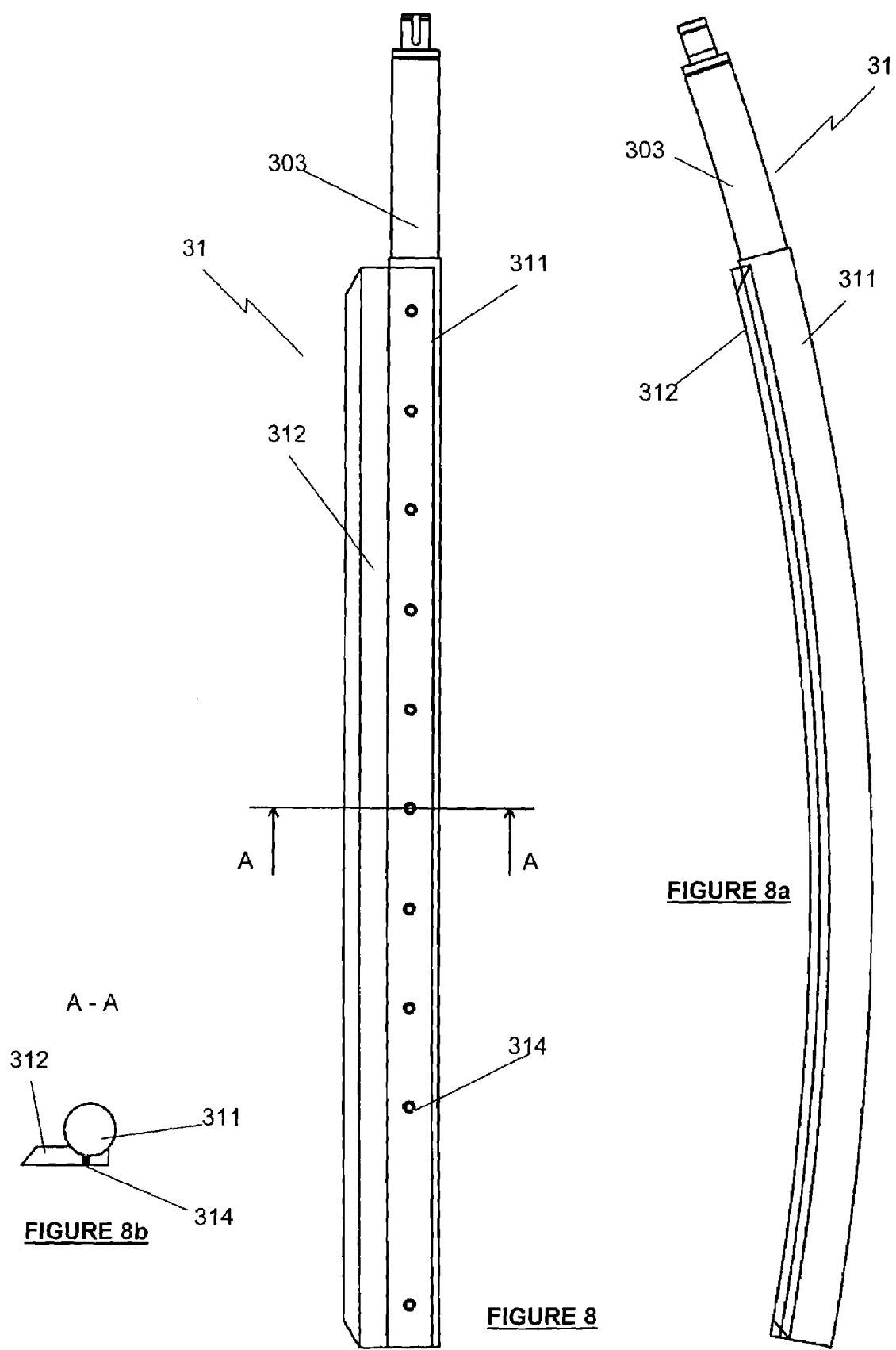

APPARATUS AND SYSTEM FOR DISPENSING DOUGH

The present invention relates to apparatus and system for dispensing dough in a production line.

Dough or cake batter can be extremely sticky and difficult to handle, particularly to dispense in a production line environment. It is usual for a great deal of manual operation to be involved because of the extreme difficulty in automating the handling and dispensing of dough on a large-scale production line. The present invention seeks to alleviate the above disadvantages.

SUMMARY OF THE INVENTION

The present invention accordingly provides a dough dispensing apparatus and system as claimed in the appended claims. In particular, the apparatus of the invention comprises a container for receiving and holding dough and a dough transfer device for receiving dough from said container and for transferring said dough to a depositing station at which the dough is deposited onto a conveying means, the dough transfer device having a conical-shaped bottom portion and including a scraper device which is fixedly attached to a holding member such that in use, when dough is contained in the dough transfer device, motion of the dough with respect to the scraper device prevents dough from adhering to an inner side wall of the dough transfer device, the scraper device being generally arcuate in profile thereby enabling the dough to be dispensed homogenously from a bottom of the dough transfer device, as required when in use, while simultaneously not adding significantly to the mixing of the dough in the dough transfer device, which would otherwise lead to over-mixing of the dough.

BRIEF DESCRIPTION OF THE DRAWINGS

(FIG. 6a shows a side view of depositing locations 4a and 4b of depositing station 4).

FIG. 8 is a front elevation of the scraper device included in the dough transfer device (conical hopper).

FIG. 8a is a side elevation of the scraper device of FIG. 8.

FIG. 8b is a sectional view along the line A-A of FIG. 8.

DETAILED DESCRIPTION

Figure 1:
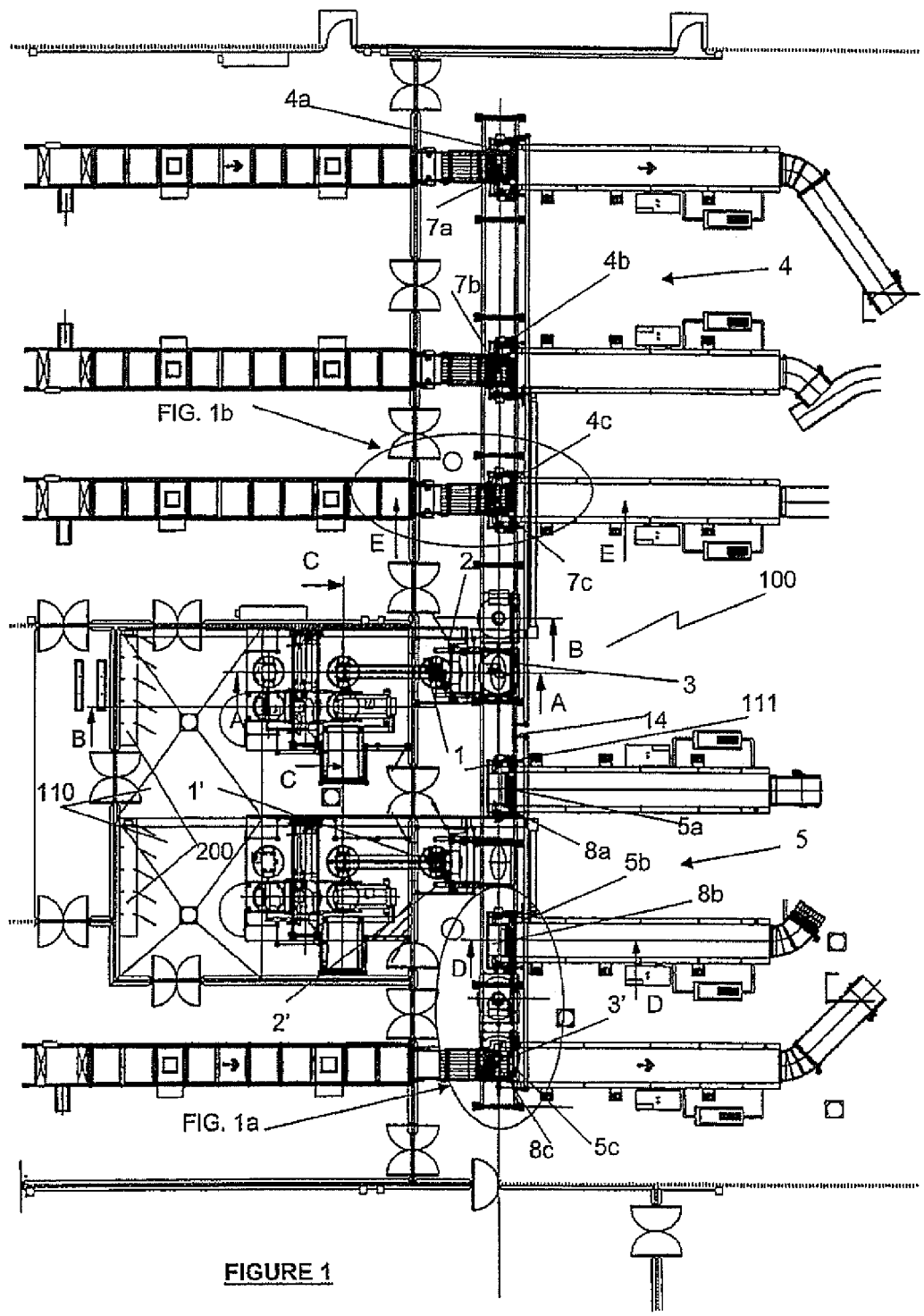
FIG. 1 is a plan view of an area of the production line showing the depositing stations.

The present invention provides a dough dispensing apparatus and system as claimed in the appended claims. In particular, the apparatus of the invention comprises a container for receiving and holding dough and a dough transfer device for receiving dough from said container and for transferring said dough to a depositing station at which the dough is deposited onto a conveying means, the dough transfer device having a conical-shaped bottom portion and including a scraper device which is fixedly attached to a holding member such that in use, when dough is contained in the dough transfer device, motion of the dough with respect to the scraper device prevents dough from adhering to the inner side walls of the dough transfer device, the scraper device being generally arcuate in profile thereby enabling the dough to be dispensed homogenously from the conical bottom of the dough transfer device, as required when in use, while simultaneously not adding significantly to the mixing of the dough in the dough transfer device, which would otherwise lead to over-mixing of the dough.

Conveniently, the apparatus includes a first longitudinal framework track along which the container is movable and a second longitudinal framework track along which the dough transfer device is moveable. Advantageously, the container consists of a bowl moveable along the first track on the first framework track.

Preferably, the dough is mixed and loaded into the bowl in a mixing room and the environment in the mixing room is controlled so that the temperature in the room is maintained at a constant temperature. Preferably, the temperature is maintained at approximately 20° C. Conveniently, in use the bowl, loaded with dough, can be moved from the mixing room to a cooking room where subsequent processing steps are carried out on the dough.

Ideally, separating means are provided for separating the mixing room from the cooking room, so that the controlled environment of the mixing room is kept intact. Preferably, the separating means includes a slideable door which is slideably moveable between a closed position in which the slideable door is effective for separating the mixing room from the cooking room and an open position in which the bowl can be moved along the track from the mixing room to the cooking room. Conveniently, the slideable door is a vertically slideable door.

Ideally, the dough dispensing apparatus includes elevating means for elevating the bowl into a raised position, in which raised position the bowl can be lifted so that dough contained in the bowl can be poured downwardly into the dough transfer device.

Preferably, the elevating means for elevating the bowl includes an elevator device which is inclined at an angle to the vertical; the elevator device including means for gripping and holding the bowl as it is moved along the inclined axis of the elevator device and means for tipping the bowl over so that in use, the dough contained in the bowl flows downwardly into the dough transfer device. Ideally, the elevator device is located in the cooking room and the bowl passes through the slideable door before being engaged with the elevator device. For example, the bowl and elevator may be clamped together. After emptying its contents, the bowl is carried back down the elevator device and travels along the track back to the mixing room for re-filling.

Preferably, the dough transfer device comprises a substantially conical shaped device which may be a hopper device. The substantially conical shape of the dough transfer device has the advantage of assisting prevention of dough adhering to inner side walls of the dough transfer device.

Ideally the dough transfer device includes a metering valve operable between a closed position in which dough held in the transfer device is retained therein and an open position in which dough can flow out of the transfer device.

Conveniently, the dough transfer device is rotatable about its longitudinal axis and in use, the transfer device is rotated (preferably slowly) about its longitudinal axis so as to result in motion of dough in the transfer device with respect to said scraper device.

Ideally the dough transfer device is in the form of a hopper container which is generally conical in shape.

Conveniently, the depositing station includes a plurality of depositing locations; with the dough transfer device being moveable along a track on the framework so that the dough transfer device can be used to supply dough to each depositing location, as required.

Preferably, each depositing location includes a deposit hopper into which the dough is transferred from the dough transfer device. Each deposit hopper then deposits the dough onto a conveyor belt for transport downline in a production line for further processing steps to be carried out on the dough.

Preferably, the dough dispensing apparatus comprises a plurality of containers for receiving and holding dough and a corresponding plurality of dough transfer devices and depositing stations.

Ideally, the dough dispensing apparatus also includes a cleaning station for cleaning the dough transfer device, the cleaning station being adapted to receive the dough transfer device and including a nozzle from which in use, a jet of cleaning fluid such as water (for example) emerges to clean the inside of the dough transfer device. The cleaning station is ideally a clean-in-place station so that the dough transfer device can be cleaned immediately at the end of production without having to be removed from the cooking room. The cleaning station includes a coverlid for the dough transfer device which is operable so that in use, when the dough transfer device is moved into an appropriate position at the cleaning station, the coverlid is secured onto the dough transfer device and cleaning fluid emerges under pressure from the spray nozzle so as to clean the dough transfer device. Ideally the cleaning station includes means for locating the coverlid onto the dough transfer device and preferably said means includes a pneumatic piston.

The cleaning station also includes means for discharging waste cleaning fluid and said disposal means preferably comprises a discharge sink.

The present invention also provides a system for dispensing dough, the system comprising a container for receiving and holding dough, a dough transfer device for receiving dough from said container and for transferring said dough to a depositing station at which the dough is deposited onto a conveying means, the dough transfer device having a conical-shaped bottom portion and including a scraper device which is fixedly attached to a holding member such that in use, when dough is contained in the dough transfer device, motion of the dough with respect to the scraper device occurs to prevent dough from adhering to an inner side wall of the dough transfer device, the scraper device being generally arcuate in profile thereby enabling the dough to be dispensed homogenously from a bottom of the dough transfer device, as required when in use, while simultaneously not adding significantly to the mixing of the dough in the dough transfer device, which would otherwise lead to over-mixing of the dough.

Conveniently, the container and the dough transfer device are moveable along first and second longitudinal framework tracks. The container is generally in the form of a bowl.

Preferably, the system includes means for mixing dough during a dough mixing and preparation process and means for loading dough into the container (bowl). The mixing of the dough is ideally carried out in a mixing room and the environment in the mixing room is controlled so that the temperature in the room is maintained at a constant temperature. Preferably, the temperature is maintained at approximately 20° C. In the mixing room, water is added to the dough ingredient(s) in a hydration step of the dough mixing and preparation process. The dough mixing and preparation process includes a further step of allowing the mixed dough to rest for a specified pre-determined length of time to enable further hydration of ingredients to occur by the water, already added. Conveniently, the pre-determined rest period is 6-10 minutes in duration and preferably about 8 minutes.

Conveniently, the system includes means for moving the bowl, loaded with dough, from the mixing room to a cooking room where subsequent processing steps are carried out on the dough. In the cooking room, cooking may be carried out by frying. In this specification, the term "frying room" is to be understood as referring to the cooking room.

Ideally, the system includes separating means for separating the mixing room from the cooking room so that the controlled environment of the mixing room is kept intact.

Preferably, the separating means includes a slideable door which is slideably moveable between a closed position in which the slideable door is effective for separating the mixing room from the cooking room (frying room) and an open position in which the bowl can be moved along the track from the mixing room to the cooking room. Conveniently, the slideable door is a vertically slideable door.

Ideally, the system includes elevating means for elevating the bowl into a raised position, in which raised position, the bowl can be lifted so that dough contained in the bowl can be poured downwardly into the dough transfer device.

Preferably, the elevating means for elevating the bowl includes an elevator device which is inclined at an angle to the vertical; the elevator device including means for gripping and holding the bowl as it is moved along the inclined axis of the elevator device and means for tipping the bowl over so that in use, the dough contained in the bowl flows downwardly into the dough transfer device. Ideally, the elevator device is located in the cooking room and the bowl passes through the slideable door before being engaged with or clamped onto the elevator device. After emptying its contents, the bowl is carried back down the elevator device and travels along the track back to the mixing room for re-filling.

Conveniently, the dough transfer device is rotatable about its longitudinal axis and in use, the transfer device is rotated (preferably slowly) about its longitudinal axis so as to result in motion of dough in the transfer device with respect to said scraper device.

Ideally, the system for dispensing dough also includes a cleaning station for cleaning the dough transfer device, the cleaning station being adapted to receive the dough transfer device and includes nozzle from which in use, a jet of cleaning fluid (such as water for example) emerges to clean the inside of the dough transfer device. The cleaning station is ideally a clean-in-place station so that the dough transfer device can be cleaned immediately at the end of production without having to be removed from the cooking room. The cleaning station includes a coverlid for the dough transfer device, which is operable so that in use, when the dough transfer device is moved into an appropriate position at the cleaning station, the coverlid is secured onto the dough transfer device and cleaning fluid emerges under pressure from the spray nozzle so as to clean the dough transfer device. Ideally the cleaning station includes means for locating the coverlid onto the dough transfer device and preferably said means includes a pneumatic piston. The cleaning station also includes means for discharging waste cleaning fluid and said disposal means preferably comprises a discharge sink.

The dough dispensing apparatus of the invention will now be described with reference to the drawings, in which are shown , by way of example only, one embodiment of the dough dispensing apparatus and system of the invention. Referring initially to FIG. 1, the dough dispensing apparatus of the invention is indicated generally by reference numeral 100. The dough dispensing apparatus 100 includes two moveable bowls 1, 1', for containing dough. The dough mixing step is carried out in a mixing room 110 having a controlled environment in which the temperature is controlled at a constant temperature of approximately 20° C. The mixing room 110 includes two mixing stations; one each for mixing dough and supplying mixed dough for each of the bowls, 1,1', respectively. Each mixing station has its own control panel (not shown). At each mixing station, an ingredient in the form of a powder is hydrated by adding water to the powder. After this hydration step in the dough preparation process, the mixture is then allowed to rest for a period of 6 to 10 minutes (generally about 8 minutes). Allowing the dough mixture to rest for this period of time at approximately 20° C., allows for further hydration to take place by the molecules of the water which was added to the powder. This process is unique and aids the dough development during the rest period due to the conditioning taking place at the controlled temperature. The mixed dough (or batter) is then loaded into the respective moveable bowls 1, 1' in the mixing room 110. The moveable bowls 1, 1' are moveable along a track on framework 14, from the controlled environment of the mixing room to a cooking room (frying room) 111 where subsequent process steps are carried out.

Figure 4:
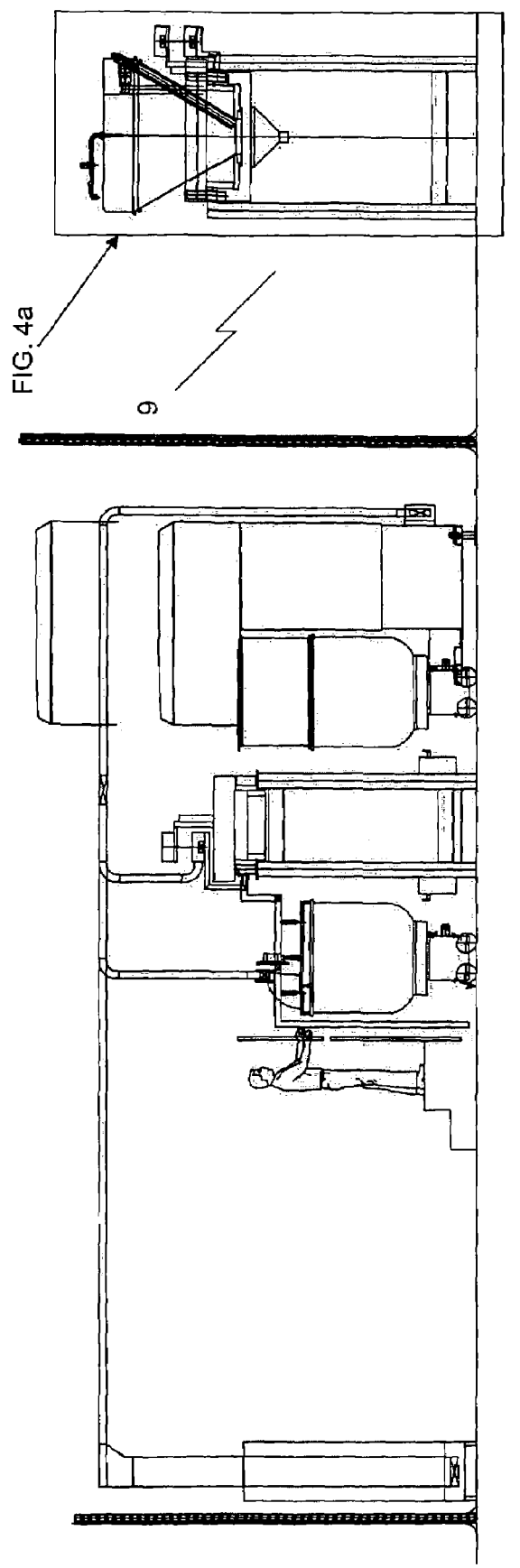
FIG. 4 is a sectional elevation along the lines B-B of FIG. 1.
Figure 4A:
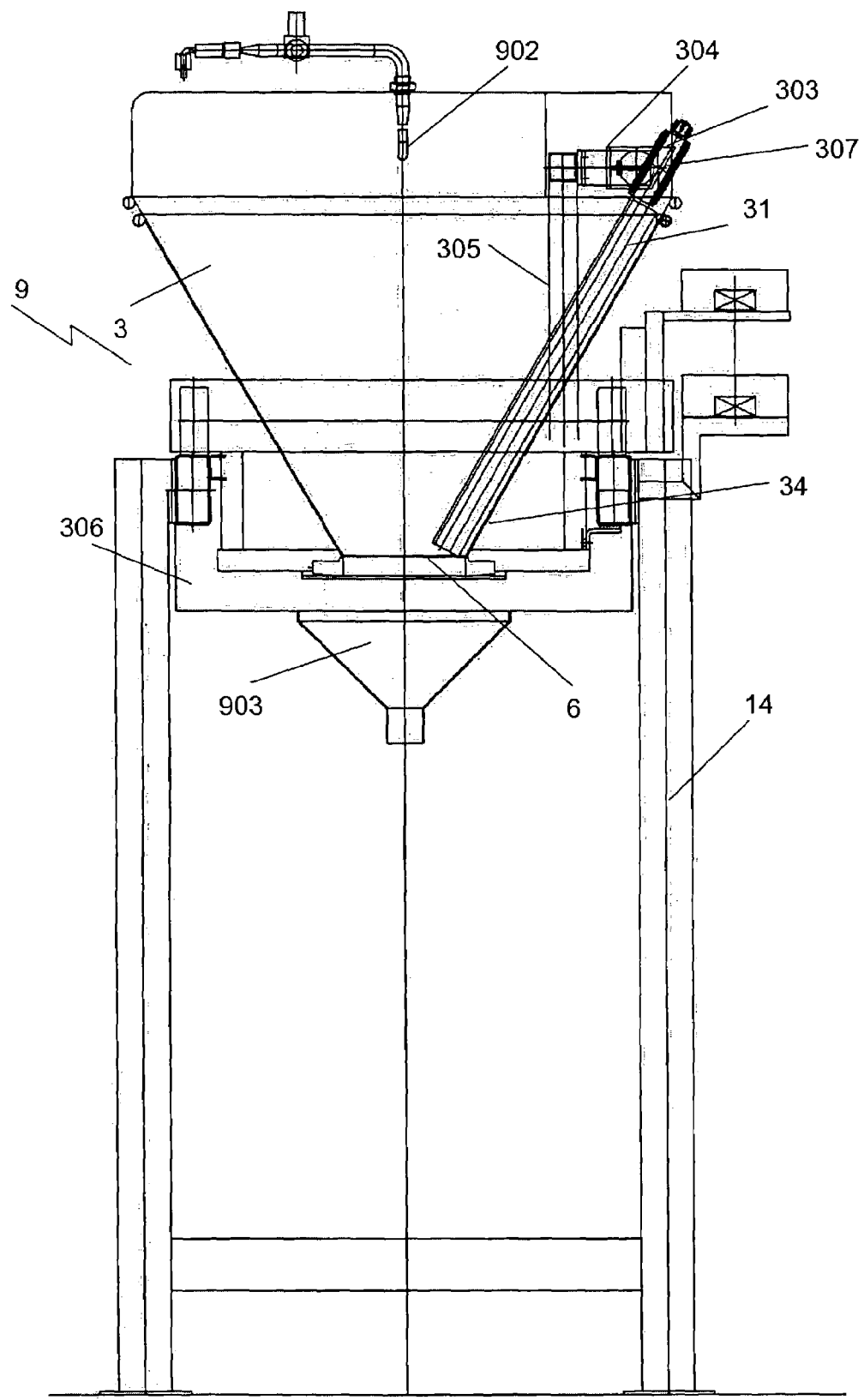
FIG. 4a is an exploded view of the conical hopper shown in FIG. 4.

The dough dispensing apparatus 100 also includes a dough transfer device for conveying the dough to depositing stations as discussed below. The dough transfer device in the illustrated embodiment comprises two respective conical hoppers 3, 3' which are located in the flying room 111. Each conical hopper 3, 3' is capable of receiving dough from its corresponding moveable bowl 1, 1' respectively. Included in each moveable bowl 1, 1' is a blade 101, 101' for agitating the dough held in each of the two bowls 1, 1'. The framework track for the conical hoppers 3, 3' is indicated on FIG. 4a by reference numerals 306, 306' respectively. The dough dispensing apparatus 100 also includes two inclined elevators 2, 2' respectively, each inclined elevator 2, 2' being for transferring respective moveable bowls 1, 1' into an elevated position in which the moveable bowl 1, 1' is located above its corresponding conical hopper 3, 3' and in which position, dough can be transferred from the moveable bowl 1, 1' into its corresponding conical hopper 3, 3' respectively. Once the bowl 1, 1' has emptied its contents, the bowl is carried back down the elevator and returned to the mixing room for re-filling.

Each conical hopper 3,3' is translatable along framework 14 to a respective depositing stations 4,5.

Each conical hopper 3,3' includes a slide valve 6, 6' (horizontal metering valve) which is operable between a closed position in which cake batter held in the hopper is retained therein and on open position in which dough can be dispensed therefrom, in a controlled manner.

Each conical hopper 3,3' also includes a fixed scraper blade 31. (The scraper blade is not shown in the drawings for conical hopper 3' but it is exactly the same in construction and operation as the scraper blade 31 in conical hopper 3 herein described). The scraper blade 31 is attached to a holding member 307. The shape of the scraper blade 31 is very important as it has a curved profile, which enables cake batter in the conical hopper to be dispensed from the bottom of the conical hopper in an even, homogenous manner. The profile of the scraper blade 31 is also very important, since as a result of the profile, the movement of the batter with respect to the scraper blade does not significantly add to the mixing effect on the batter and therefore does not lead to over mixing of the batter. The scraper blade 31 is best illustrated on FIGS. 8, 8a and 8b and comprises an arcuate stainless steel bar 311 which is arcuate in cross-section and a nylon scraper bar 312 which is fixed to the main stainless steel bar 311 by means of a plurality of screws 314 and the nylon scraper bar 312 repeats the curvature of the main stainless steel bar 311. The stainless steel bar 311 includes a handle 303 by which the scraper 31 is gripped in the holding member 307.

Each conical hopper 3,3' is rotatable about its own longitudinal axis. Each conical hopper 3,3' is kept slowly rotating (1-2 rpm) about its own longitudinal axis, with the scraper blade 31 remaining stationary in its holding device 307, when dough is contained in the conical hoppers and the conical hoppers are in use for transferring dough to the respective depositing stations 4,5. This slow rotation of the conical hoppers 3,3' results in the dough held therein coming into contact with the scraper blade 31 respectively and this action prevents the dough from sticking to the inner side walls of the conical hoppers 3,3'. The scraper 31 gently handles the dough to keep it from sticking to the side walls of the conical hopper 3. It is especially important to note that the scraper blade 31 does not actually work the dough and excessive rotation speeds of the conical hoppers 3 would result in over-mixing of the batter contained therein.

Also included in each conical hopper 3 are a handle 303 of the scraper blade 31 and a turning device 304 which enables adjustment of the scraper blade 31 so that the scraper blade 31 can be in contact with an inclined wall 34 of the conical hopper 3. There is also a vertical holder 305 for holding the turning device 304.

Figure 1A:
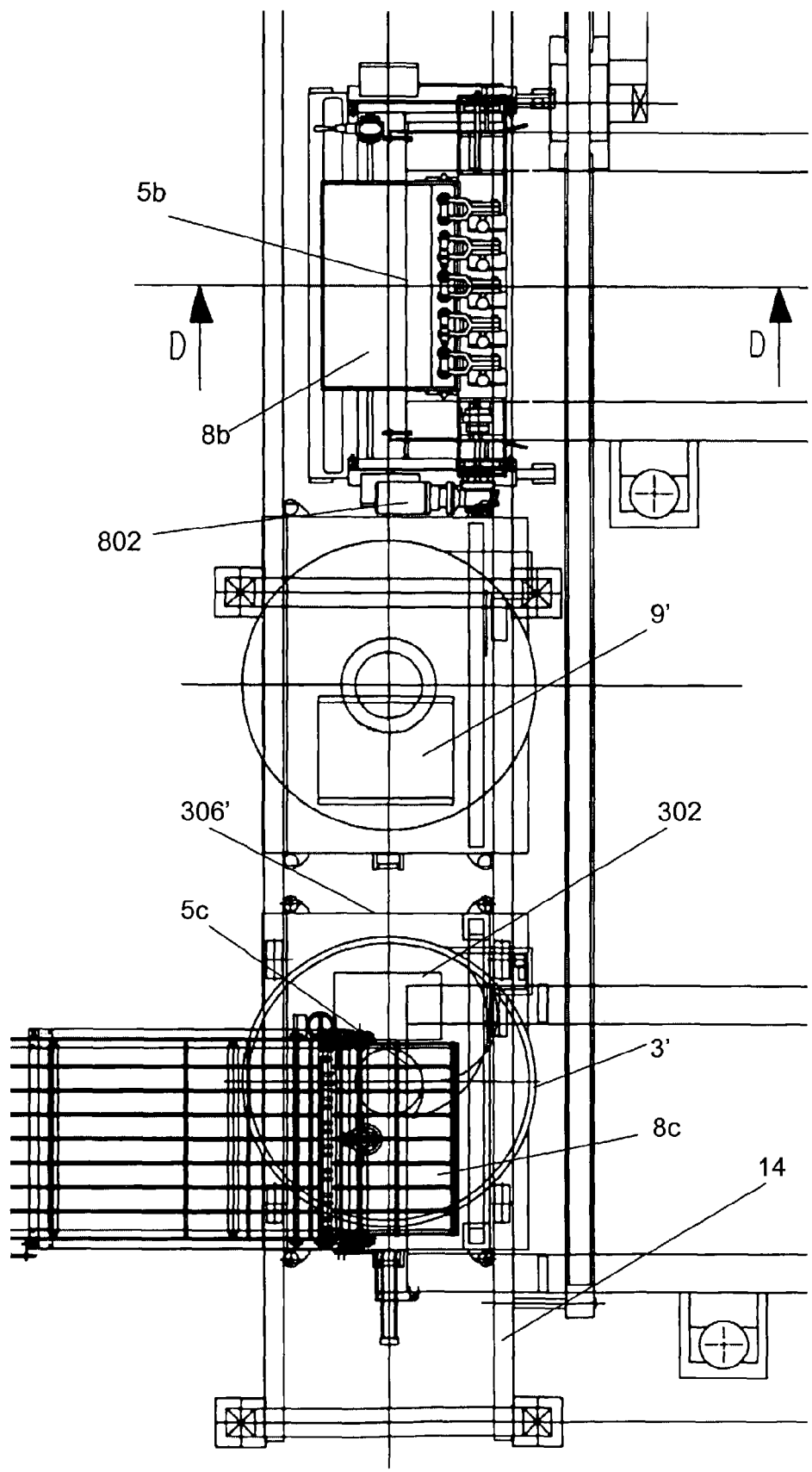
FIG. 1a is an exploded plan view of a first depositing location.
Figure 1B:
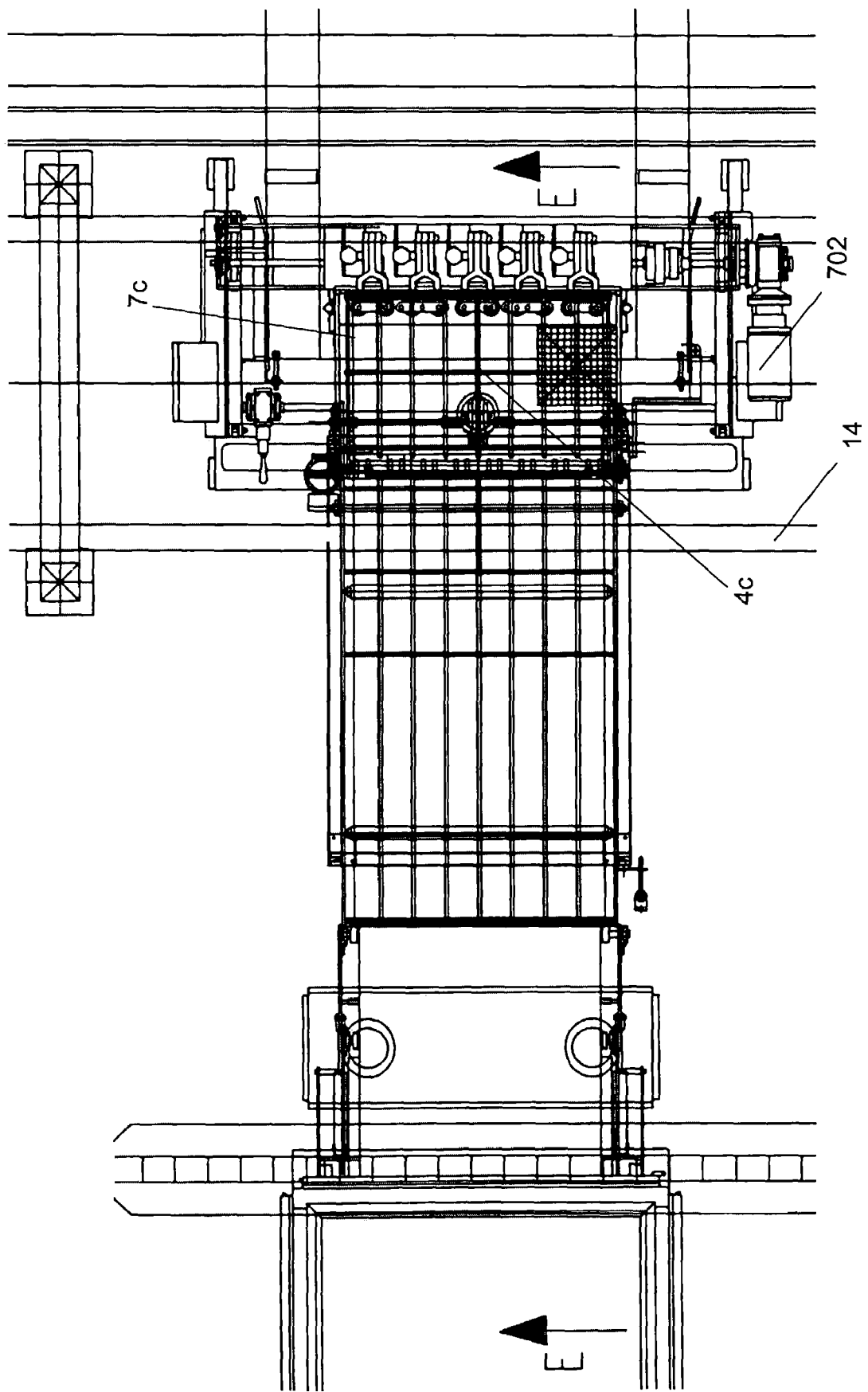
FIG. 1b is an exploded plan view of a second depositing location.
Figure 2:
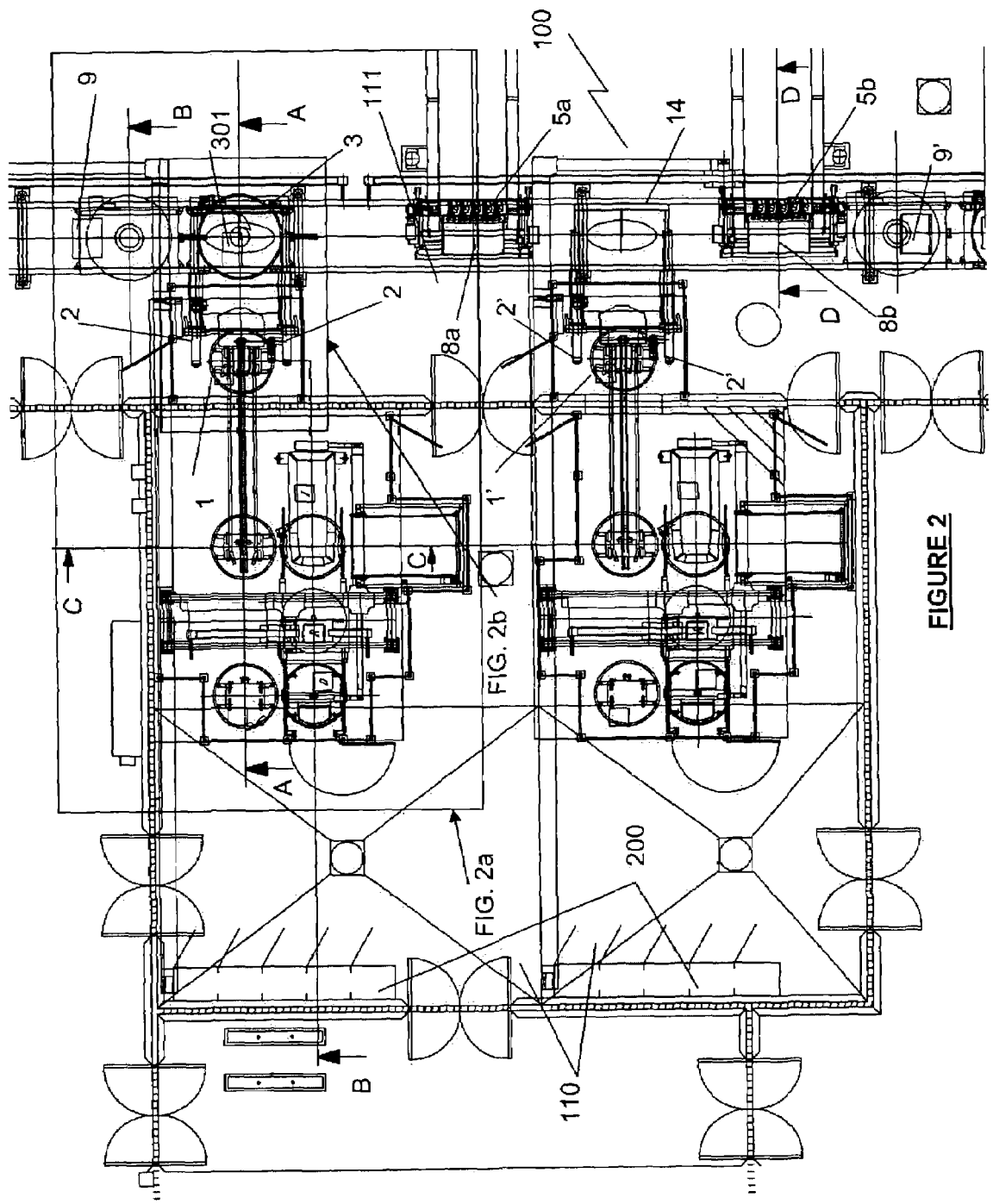
FIG. 2 is a plan view of the area including the dough transfer device (conical hopper) and dough transfer device (conical hopper).
Figure 2A:
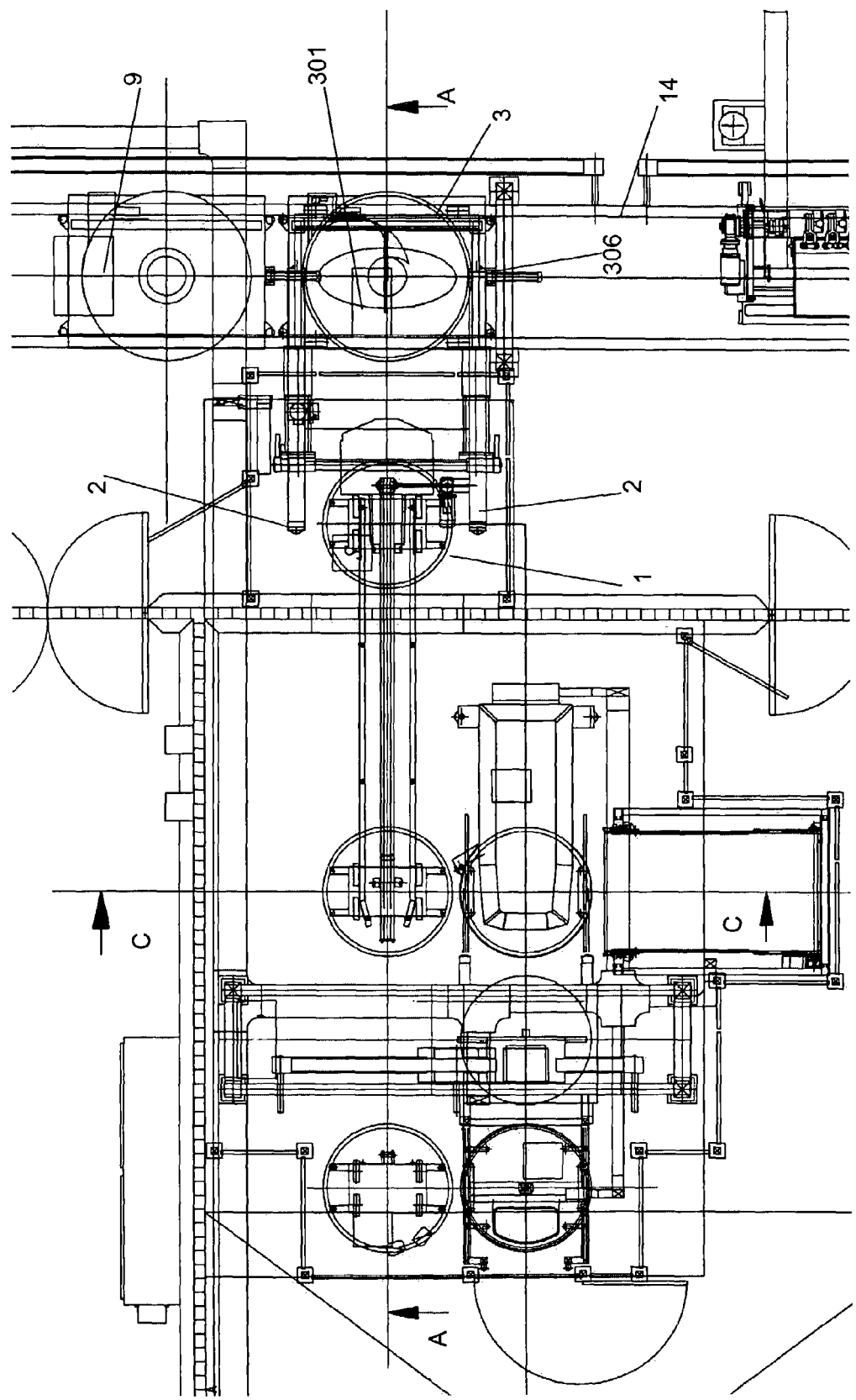
FIG. 2a is an exploded plan view of the area including conical hopper and hopper-washing station.

Also included in the conical hoppers 3, 3' is a transferring robot 302 (shown on FIG. 1a) for moving the conical hopper 3' along the framework 14 and a transferring robot 301 (shown on FIG. 2) for moving conical hopper 3 along the framework 14.

Each depositing station 4, 5, includes three depositing locations 4a, 4b, 4c and 5a, 5b, 5c, respectively. Each depositing location 4a, 4b, 4c; 5a, 5b, 5c includes a depositing hopper 7a, 7b, 7c; 8a, 8b, 8c respectively. Thus at each of the depositing locations 4a, 4b, 4c dough 50 can be deposited from the conical hopper 3 into the depositing hoppers 7a, 7b, 7c respectively, while at depositing locations 5a, 5b, 5c dough can be deposited from the conical hopper 3' into depositing hoppers 8a, 8b, 8c respectively. Thus the conical hoppers 3,3' are transported longitudinally along the framework 14, shuttling between the corresponding respective depositing locations.

Figure 2B:
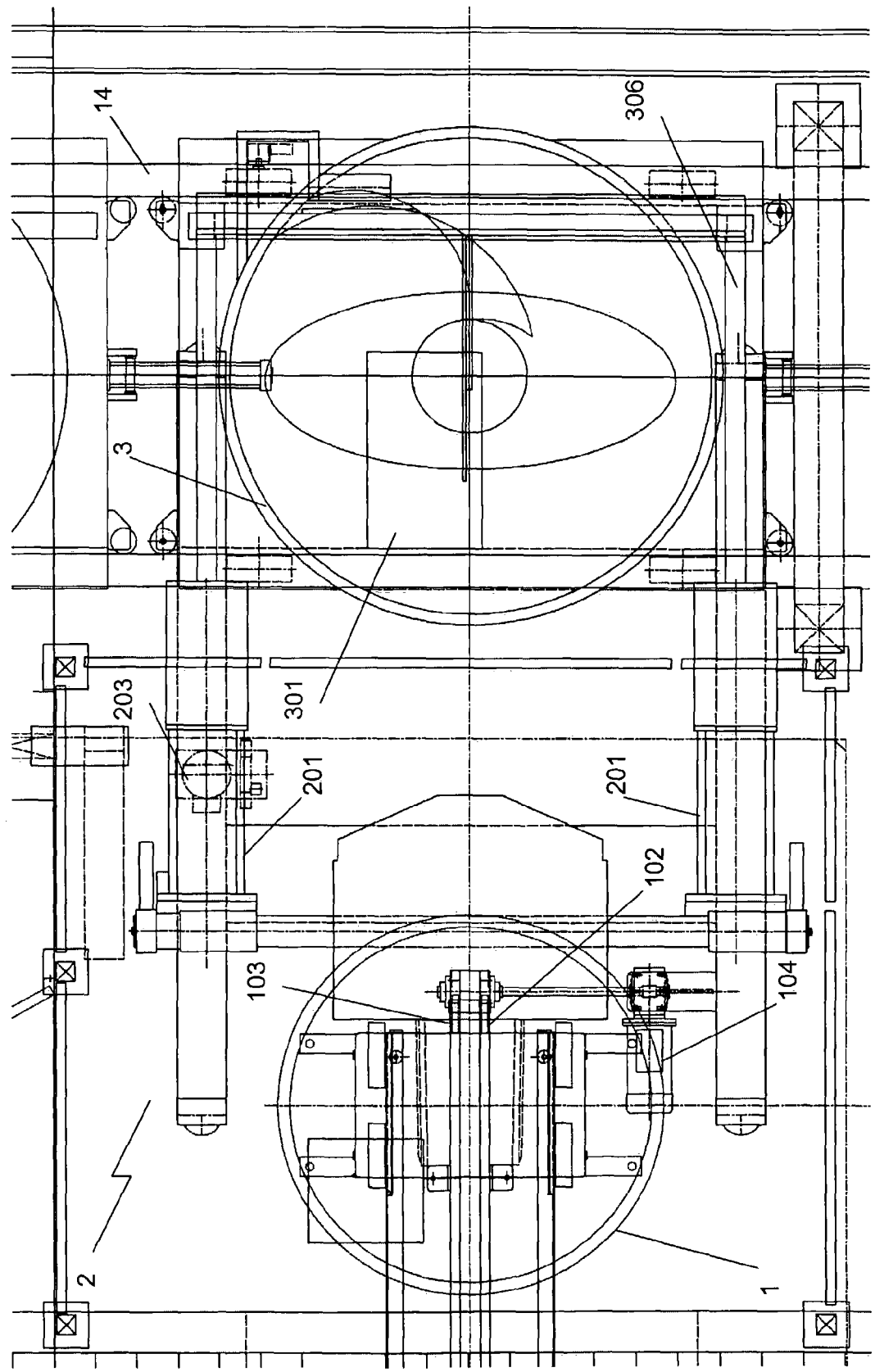
FIG. 2b is an exploded plan view of the area including the moveable bowl and conical hopper.
Figure 3:
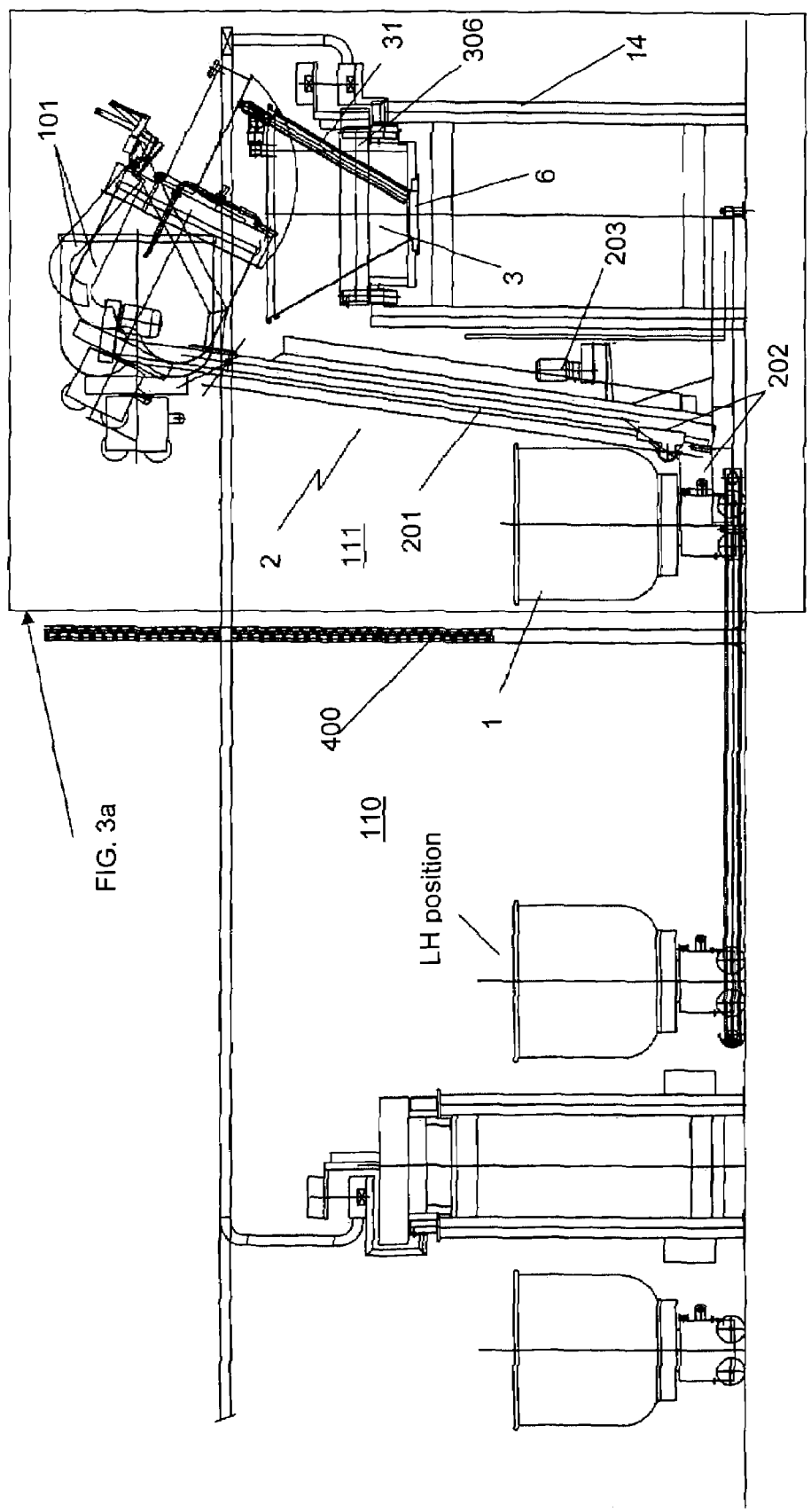
FIG. 3 is a sectional elevation along the lines A-A of FIG. 1.
Figure 3A:
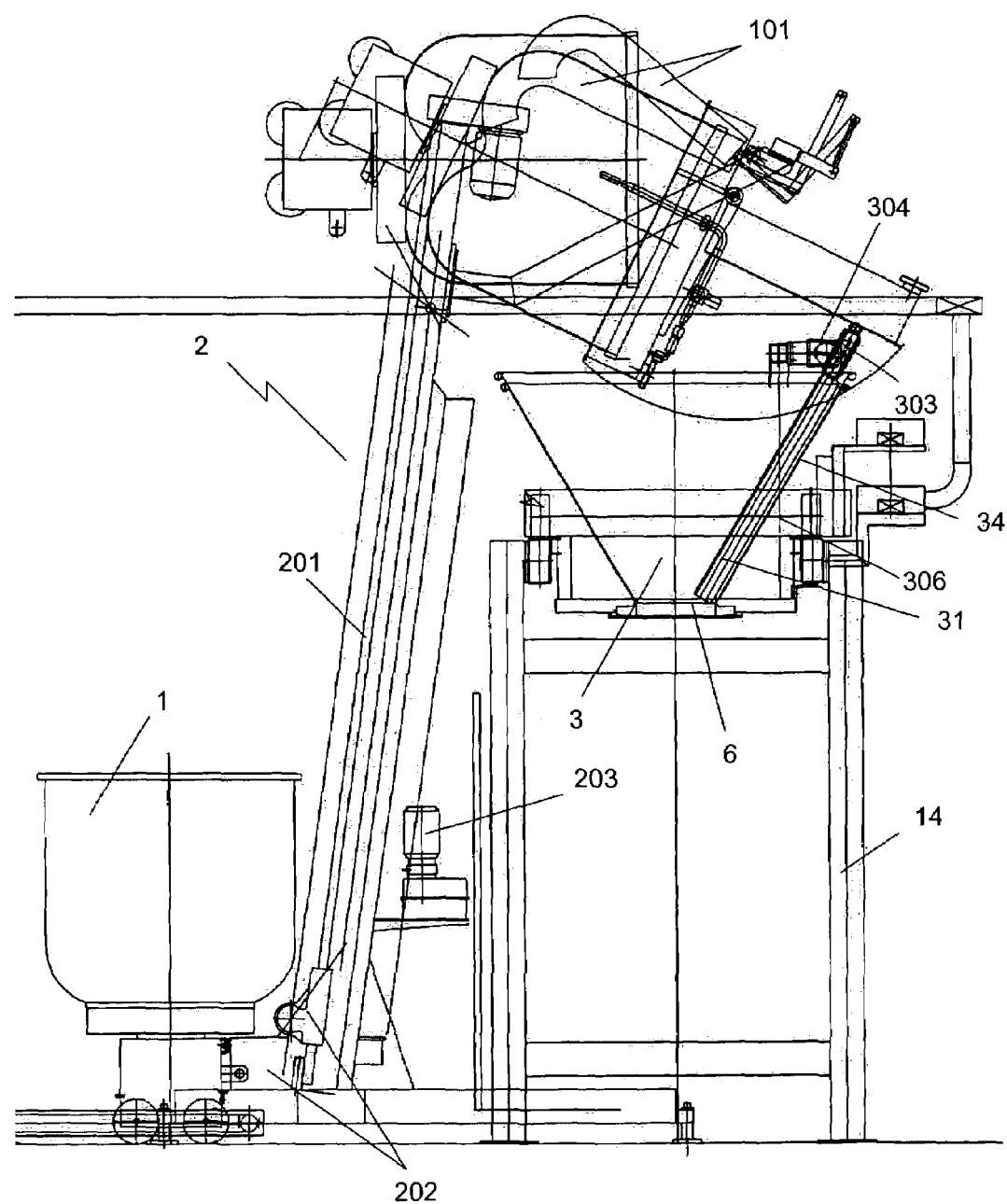
FIG. 3a is an exploded view of FIG. 3.

Thus each conical hopper 3, 3' is loaded from its own bowl 1, 1' respectively. On FIG. 1 the conical hopper 3' is shown at the moment when it, loaded with batter, is ready to deposit the batter at the depositing location 4c. Also each conical hopper serves its own group of depositing locations with conical hopper 3 serving depositing station 4 and conical hopper 3' serving depositing station 5. The depositing stations 4, 5, are of the same construction except that depositing locations 5a, 5b, 5c are positioned in such a manner between two conveyers and at the end of the first conveyer is the beginning of the second conveyor as shown in FIG. 1. Such a positioning does not affect the design of the depositing location 5. The same applies to depositing location 4c as shown on FIG. 1. Referring to FIGS. 2b, 3 and 3a, each inclined elevator 2,2' includes an inclined elevator guide rail 201, a clamping device 202 which is moveable up and down along the inclined elevator guide rail 201. (The detailed construction of inclined elevator 2' is not shown in the drawings but it is exactly the same as for inclined elevator 2. It is to be understood therefore that the manner of operation is the same for both inclined elevators 2,2' included in each of the production lines fed from respective bowls 1,1'). Each bowl 1,1' is transferred onto its respective inclined elevator 2,2' by horizontal movement created by a respective chain drive 104, each chain drive 104 having two nylon blocks 102, 103, attached thereto which blocks 102, 103 push the bowl 1,1' to and from the LH position (shown on FIG. 3) with the bowl 1,1' rolling across the floor on its own wheels. Each chain drive 104 stops when the bowl 1,1' is located at the base of elevator 2,2', respectively. One block 102 pushes the bowl loaded with batter towards the inclined elevator and the second block 103 pushes the emptied bowl 1,1' back from the elevator, when the drive chain 104 is in reverse. The elevator 2,2' also has a clamping device 202 which clamps the bowl 1,1' and allows it to be raised upwardly onto the inclined elevator 2,2', respectively from each respective horizontal drive chain 104 and respective nylon blocks 102,103 under the action of the respective elevator motor and chain mechanisms. Each elevator motor 203 drives the respective chain mechanism (not shown) which chain mechanism is in turn connected to the clamping device 202,202' so that in use, the chain mechanism is operative to lift the clamping device 202,202' and the bowl 1,1', respectively, secured thereto. Each bowl 1,1' is held on the elevator 2,2' by means of a respective mechanical clamping device 202 which grips the bowl at its base and elevates the bowl along the guide rail to the tipping position. The mechanical clamping device 202 on each elevator is operated by hydraulics.

The moveable bowl 1,1' is loaded with dough in the controlled environment of the mixing room and is then moved along its track on framework 14 and is transferred to the inclined elevator 2,2'. The moveable bowl 1,1' is then elevated along the axis of the respective inclined elevator 2,2'. As the moveable bowl 1,1' travels along the respective inclined elevator 2,2' it passes from the controlled environment of the mixing room into the cooking room (frying room) in which the temperature is ambient temperature. As the bowl 1.1' moves towards the cooking room, a signal is given to open the vertically slideable door 400 (shown on FIG. 3) that separates the controlled environment of the mixing room 110 from the environment of the cooking room 111, so as to allow the loaded bowl 1,1' to enter the cooking room and to travel to the base of the inclined elevator 2,2' where it is clamped onto the respective inclined elevator 2,2'.

When the bowl 1,1' reaches the top of the elevator 2,2', respectively, the bowl 1, 1' is tipped in order to dispense cake batter into the respective conical hoppers 3,3'. Each bowl 1,1' is tipped due to the clamping device 202 following the guide rail 201 which is curved in the direction of tipping (curvature of guide rail not shown in drawings). As the elevation motion takes place, the bowl and clamping device 202 follow the guide rail 201 and the curvature of the guide rail 202 creates the tipping angle.

Figure 5:
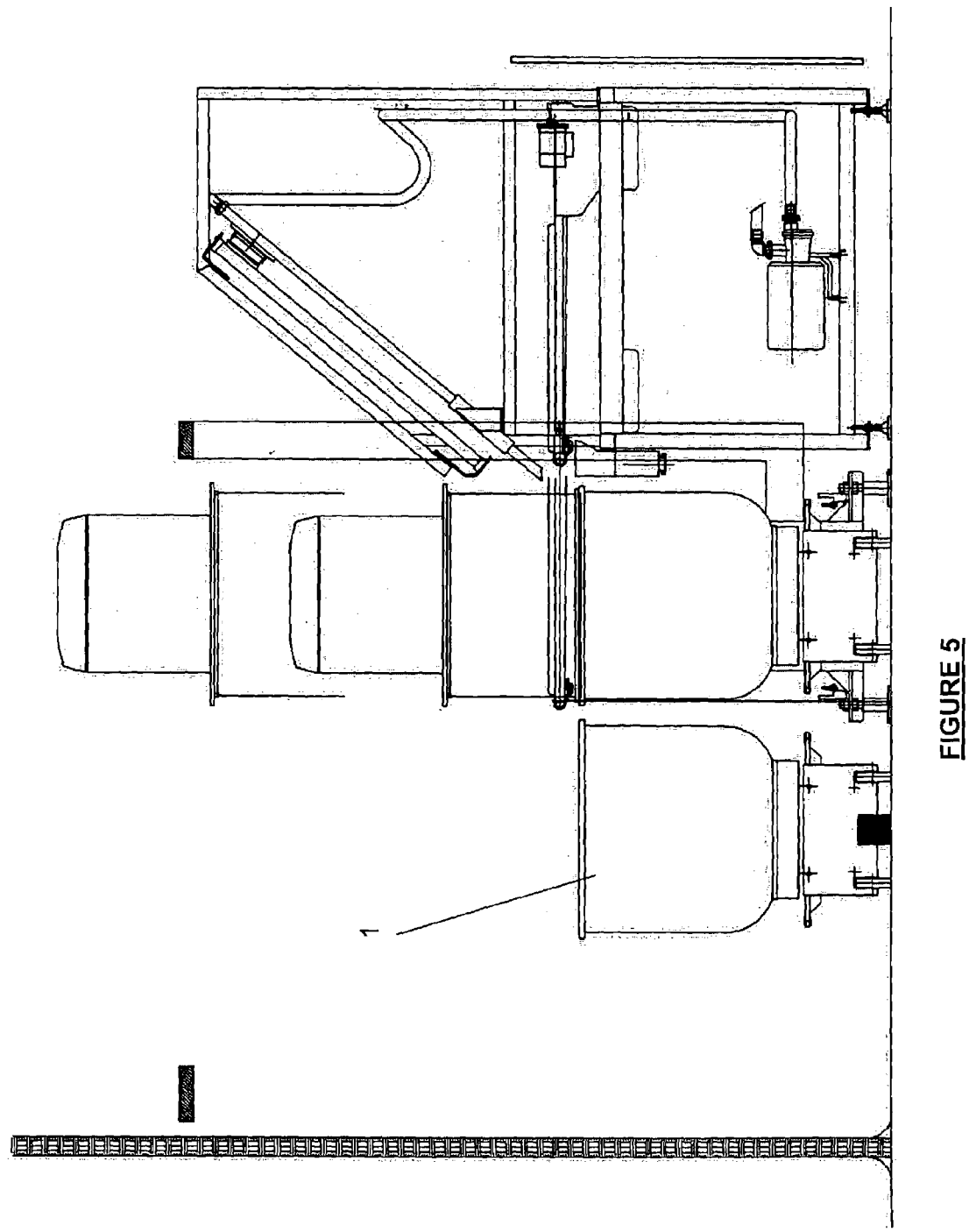
FIG. 5 is a sectional view along the lines C-C of FIG. 1.

Referring now to FIG. 5, the movement of the mixing head into the mixing bowl is shown. FIG. 5 also shows the drip collection conveyor which moves under the mixing paddles when the mixer head is elevated to collect drips of batter from the paddles, thereby preventing the drips of batter from falling onto the floor. This drip collection conveyor can then be rotated to allow the drips to be added into the next batch, thereby reducing wastage.

Figure 6:
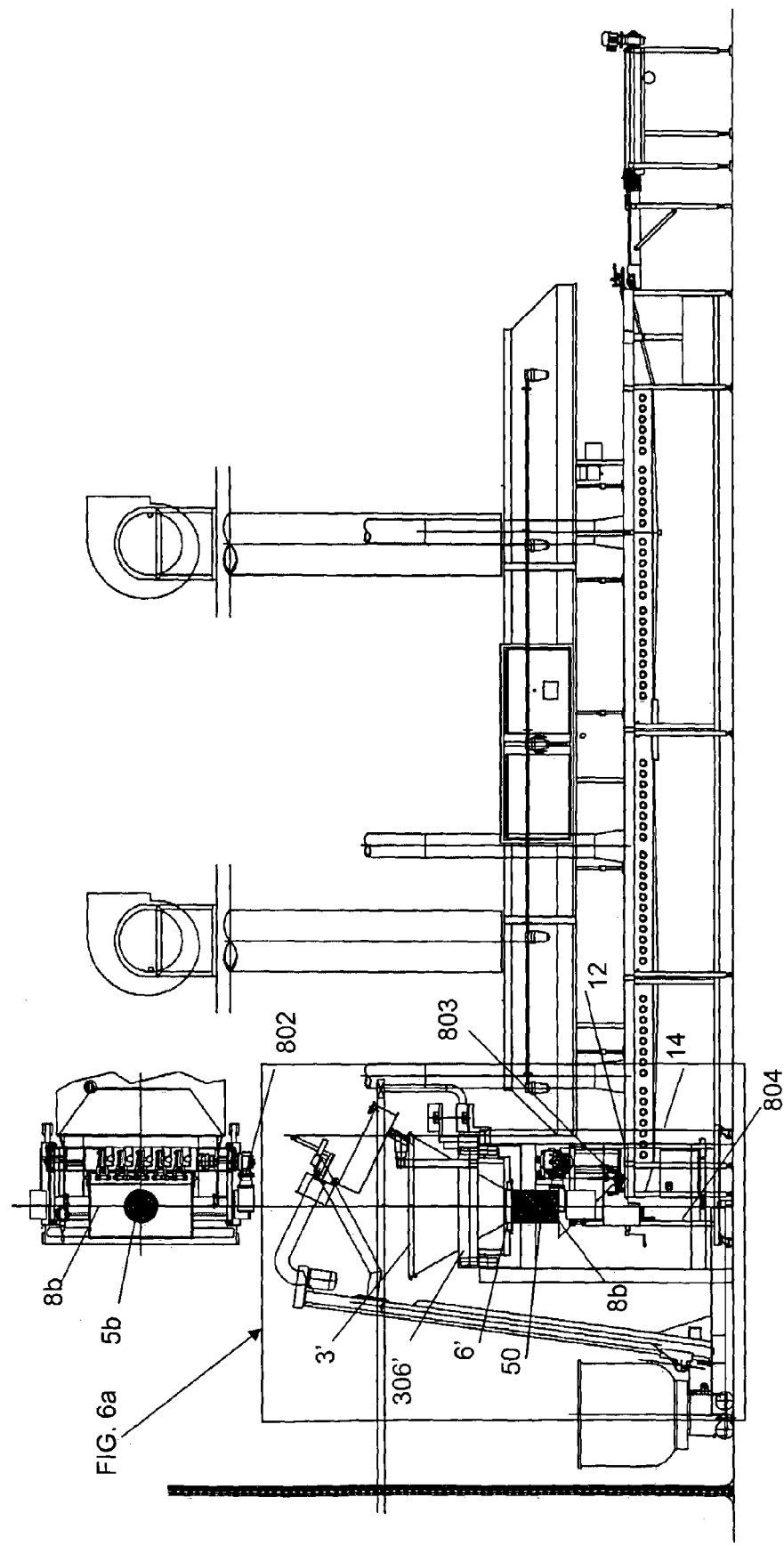
FIG. 6 is a sectional elevation along the lines D-D of FIG. 1.
Figure 6A:
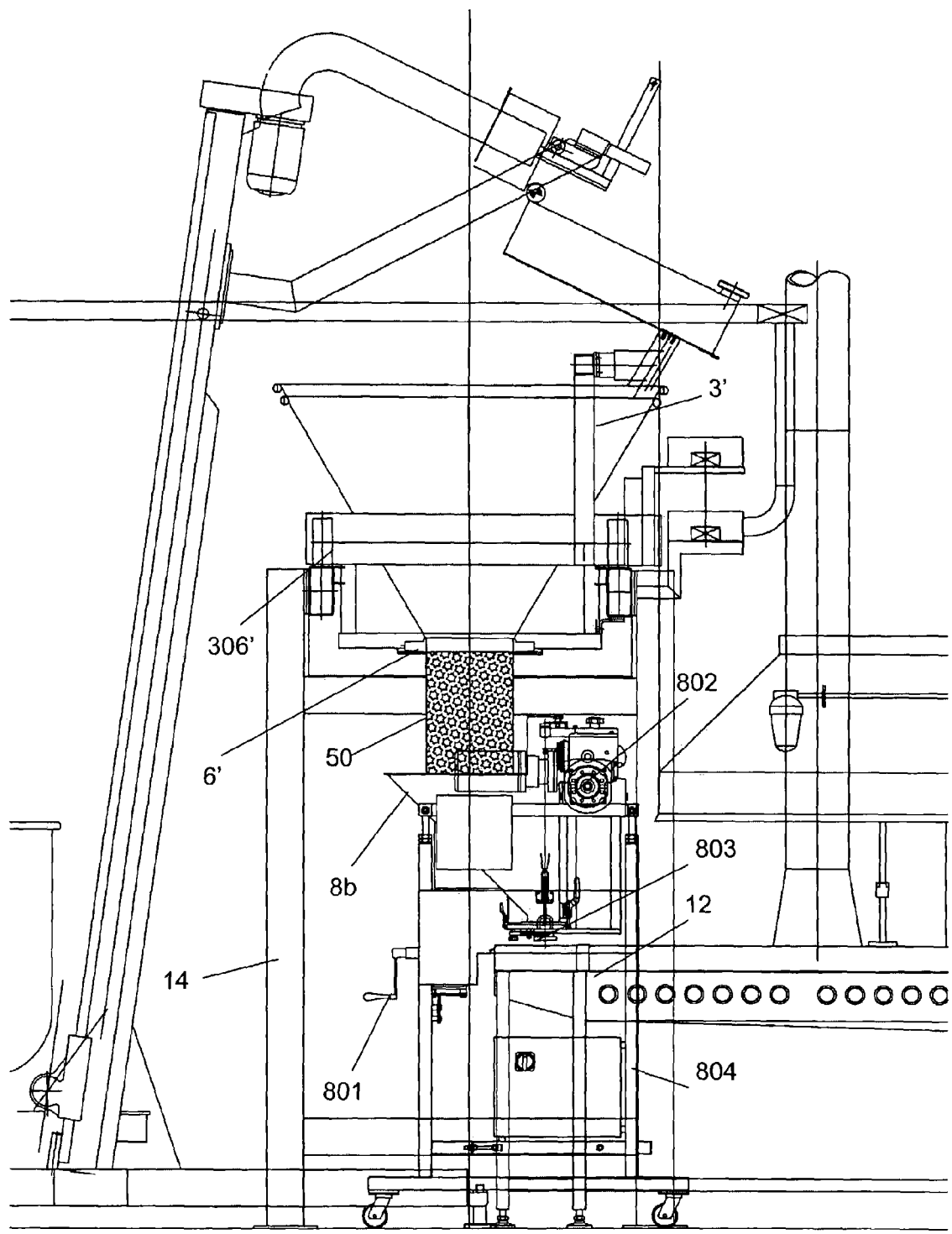
FIG. 6a is an exploded view of the conical hopper and associated components as shown in FIG. 6.
Figure 7:
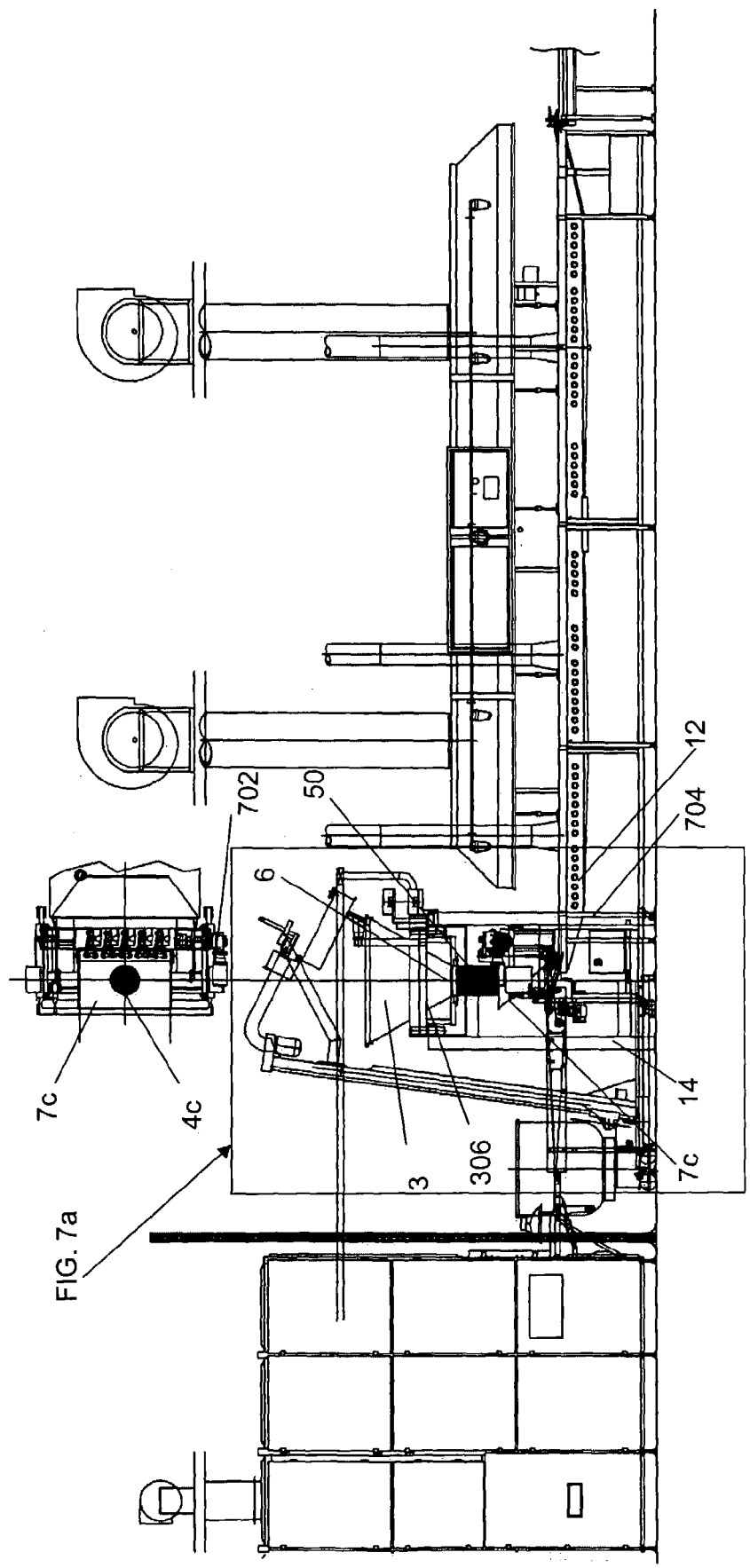
FIG. 7 is a sectional elevation along the lines E-E of FIG. 1.
Figure 7A:
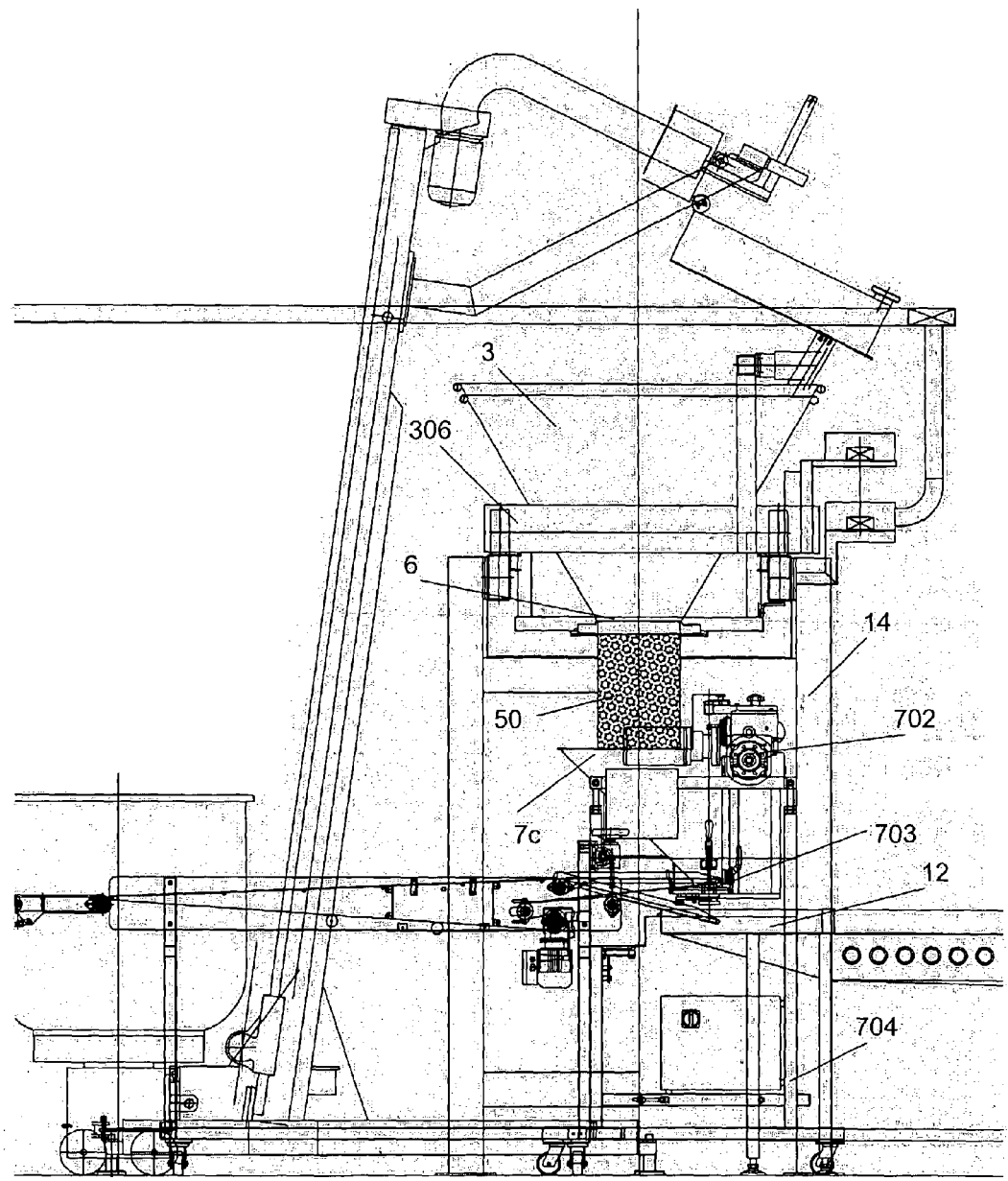
FIG. 7a is an exploded view of figure 7, (FIG. 7a shows a side view of depositing locations 5a, 5b, 5c of depositing station 5).
Figure 9:
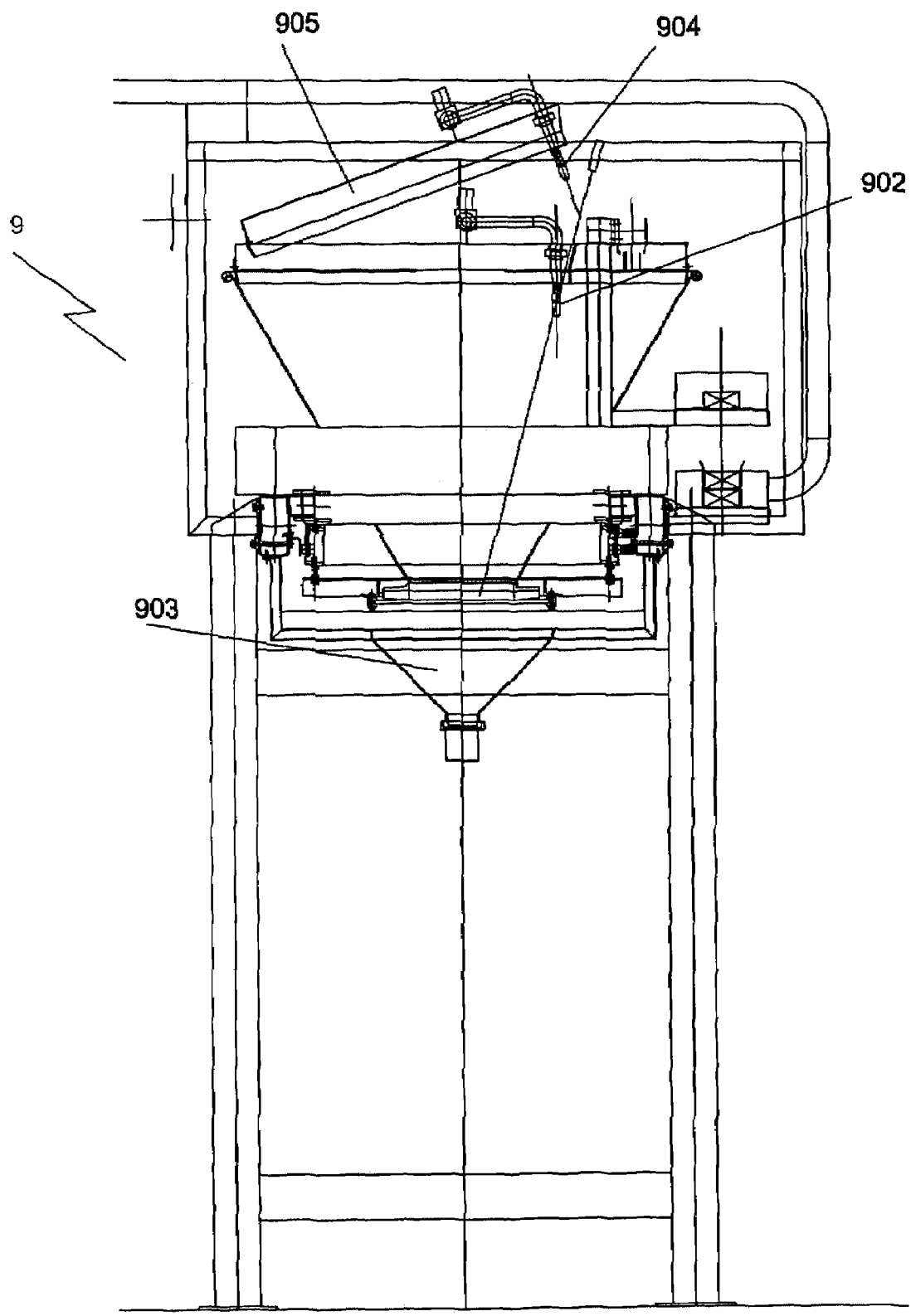
FIG. 9 is an elevation of the cleaning station (clean-in place (CIP) station).

Referring now to FIG. 6a and FIG. 7a each of the depositing hoppers 7a, 7b, 7c and 8a, 8b, 8c include a framework basis 704, 804 respectively on which the whole construction of the depositing hoppers 7a, 7b, 7c and 8a, 8b, 8c, respectively is mounted. Each depositing hopper 7a, 7b, 7c also includes a nozzle 703 through which the batter is dispensed onto conveyor 12 together with a handle to adjust the distance between the nozzle 703 and the conveyor 12. Each depositing hopper 8a, 8b, 8c also includes a nozzle 803 through which the batter is dispensed onto conveyor 12 together with a handle 801 to adjust the distance between the nozzle 803 and the conveyor 12. As can be seen on FIGS. 1a, 1b and FIGS. 6 and 7, there is also an electric drive 702 for driving the depositing hoppers 7a, 7b, 7c and an electric drive 802 for driving the depositing hoppers 8a, 8b, 8c.

Also included in the dough handling apparatus 100 of the invention is a clean-in place (CIP) washing station 9 for washing the conical hopper 3 and a corresponding clean-in place (CIP) washing station 9' for washing conical hopper 3'. (The detailed construction of the cleaning station 9' is not shown in the drawings but it is the same as for cleaning station 9' described herein below). The cleaning system operates when the conical hoppers are moved into the dedicated CIP positions. A specially designed respective coverlid 905 is automatically lowered on top of each conical hopper 3,3' using a pneumatic piston and each lid 905 includes the two water jets 902,904. At the washing stations 9,9', a continuous jet of water under pressure is sprayed into the conical hopper 3,3' respectively from water stream nozzles 902,904. Also included in the washing stations 9, is a water discharge sink 903 for discharging waste water.

The manner of operation of the dough dispensing apparatus will now be described in relation to a single section of the production line including the moveable bowl 1, inclined elevator 2 and the conical hopper 3 and depositing station 4 as well as cleaning station 9. These steps are controlled at control panel 200. It will of course be understood that the exact same steps are carried out at each of the other of the plurality of corresponding sections of the production line, e.g. in relation to second moveable bowl 1', second conical hopper 3', second depositing station 5 and second cleaning station 9'. These steps are controlled at corresponding control panel 200'.

While the system is described below in connection with cake batter, it is to be understood that it is usable generally in connection with the cooking of materials which in their raw state are described as dough or batter.

Step 1

The cake batter mixing is carried out in a controlled environment in which the temperature is controlled at a constant temperature of 20° C. The batter/dough is loaded into the moveable bowl 1. The moveable bowl 1 containing dough is moved along its track on framework 14. As the moveable bowl 1 travels along the inclined elevator 2 it passes from the controlled environment of the mixing room into the uncontrolled environment of the frying room. There, the bowl is transferred to the inclined elevator system 2 and the moveable bowl 1 is then elevated along the axis of the inclined elevator 2.

Step 2

The moveable bowl 1 is now in the cooking room (frying room) and when the moveable bowl 1 is in position at the top of the inclined elevator 2, the bowl 1 is tipped over as shown in FIG. 3*a* and dough is dispensed into the uniquely shaped conical hopper 3.

Step 3

When the bowl 1, is completely empty, it is returned back down along the inclined elevator 2 and along the horizontal track to the mixing room for re-filling.

Step 4

The conical hopper 3 is translated along the framework 14 to one of the three possible depositing locations 4*a*, 4*b*, 4*c* of depositing station 4.

Step 5

The conical hopper 3 stops in position at a first depositing station 4*a* and deposits the dough 50 into a first depositing hopper 7*a*. When the required quantity has been poured into the depositing hopper 7*a*, the slide valve (horizontal metering valve) 6 is moved into the closed position to contain the remaining amount of dough in the conical hopper 3.

Step 6

The conical hopper is then moved to the next depositing location 4*b* where it stops and deposits dough into a depositing hopper 7*b* until the dough is filled to a predetermined level. Then the slide valve 6 is again closed to retain the remaining amount of dough in the conical hopper 3. The conical hopper 3 is then moved to the third depositing location 4*c* where the above steps are repeated to fill the depositing hopper 4*c* to a predetermined level at which point, the slide valve 6 is closed.

Step 7

The conical hopper 3 will continue to fill the respective depositing hoppers 7*a*, 7*b*, 7*c* at the depositing station 4, when the dough in any of the depositing hoppers 7*a*, 7*b*, 7*c* reaches a low level. This process continue until such time as the conical hopper 3 is completely empty.

Step 8

The next unique feature of this design is the cleaning of the conical hopper 3. Two clean-in-place (in situ) cleaning station 9, are centrally located between the depositing stations 4, 5 cleaning station 9 is for cleaning conical hopper 3. A specially designed scraper blade 901 is fixed in position. A continuous jet of water is sprayed into the conical hopper 3 from a water stream nozzle 902, 904.

Step 9

The conical hopper 3 is designed to rotate about its own vertical axis when the water jet stream cycle begins. As the conical hopper 3 rotates, cleaning is achieved due to the profile of the surface of the conical hopper 3, coming into contact with the fixed scraper blade 31.

Step 10

When step nine is completed, the conical hopper 3 is translated across the longitudinal framework 14 to the initial position of the cycle in anticipation of the next moveable bowl 1 full of dough.

It will of course, be understood that the invention is not limited to the specific details described herein, which are given by way of example only and that various modifications and alterations are possible within the scope of the invention as defined by the appended claims.

The invention claimed is:

1. A dough dispensing apparatus comprising a container for receiving and holding dough and a dough transfer device for receiving dough from said container and for transferring said dough to a depositing station at which the dough is deposited onto a conveying means, the dough transfer device having a conical-shaped bottom profile and including a scraper device which is fixedly attached to a holding member such that in use, when dough is contained in the dough transfer device, motion of the dough with respect to the scraper device occurs to prevent dough from adhering to an inner side wall of the dough transfer device, the scraper device being generally arcuate in profile thereby enabling the dough to be dispensed homogenously from a bottom of the dough transfer device, while simultaneously not adding significantly to the mixing of the dough in the dough transfer device, which would otherwise lead to over-mixing of the dough.

2. The dough dispensing apparatus as claimed in claim 1, wherein the apparatus includes a longitudinal first framework track along which the container is movable and a second longitudinal framework track along which the dough transfer device is moveable, the dough transfer device being movable to deposit dough at one or more deposit stations.

3. The dough dispensing apparatus as claimed in claim 2, wherein the dough is mixed and loaded into the container in a mixing room and the environment in the mixing room is controlled so that the temperature in the room is maintained at a constant temperature.

4. The dough dispensing apparatus as claimed in claim 3, wherein the temperature is maintained at approximately 20° C.

5. The dough dispensing apparatus as claimed in claim 3, wherein, in use, the container, loaded with dough, can be moved from the mixing room to a cooking room where subsequent processing steps are carried out on the dough.

6. The dough dispensing apparatus as claimed in claim 5, wherein separating means are provided for separating the mixing room from the cooking room, so that the controlled environment of the mixing room is kept intact.

7. The dough dispensing apparatus as claimed in claim 6, wherein the separating means includes a slideable door which is slideably moveable between a closed position in which the slideable door is effective for separating the mixing room from the cooking room and an open position in which the container can be moved along the first framework track from the mixing room to the cooking room.

8. The dough dispensing apparatus as claimed in claim 5, wherein the dough dispensing apparatus includes elevating means for elevating the container into a raised position, in which raised position the container can be tilted so that dough held in the container can be poured downwardly into the dough transfer device.

9. The dough dispensing apparatus as claimed in claim 8, wherein the elevating means for elevating the container includes an elevator device which is inclined at an angle to the vertical; the elevator device including means for gripping and holding the container as it is moved along the inclined axis of the elevator device and means for tipping the container over so that in use, the dough contained in the container flows downwardly into the dough transfer device.

10. The dough dispensing apparatus as claimed in claim 9, wherein the elevator device is located in the cooking room and the container passes through the slideable door before being engaged with the elevator device.

11. The dough dispensing apparatus as claimed in claim 1, wherein the dough transfer device includes a metering valve operable between a closed position in which dough held in the dough transfer device is retained therein and an open position in which dough can flow out of the dough transfer device.

12. The dough dispensing apparatus as claimed in claim 1, wherein the dough transfer device is rotatable about its longitudinal axis and in use, the dough transfer device is rotated about its longitudinal axis so as to result in motion of dough in the dough transfer device with respect to said scraper device.

13. The dough dispensing apparatus as claimed in claim 1, wherein the depositing station includes a plurality of depositing locations; with the dough transfer device being moveable along the second framework track so that the dough transfer device can be used to supply dough to each depositing location, as required.

14. The dough dispensing apparatus as claimed in claim 13, wherein each depositing location includes a deposit hopper into which the dough is transferred from the dough transfer device, each deposit hopper including means for depositing dough onto a conveyor belt for transport downline in a production line for further processing steps to be carried out on the dough.

15. The dough dispensing apparatus as claimed in claim 1, wherein the dough dispensing apparatus comprises a plurality of containers for receiving and holding dough and a corresponding plurality of dough transfer devices and depositing stations.

16. The dough dispensing apparatus as claimed in claim 1, wherein the dough dispensing apparatus also includes a cleaning station for cleaning the dough transfer device, the cleaning station being adapted to receive the dough transfer device and including a nozzle for spraying a jet of cleaning fluid to clean the inside of the dough transfer device.

17. The dough dispensing apparatus as claimed in claim 16, wherein the cleaning station includes a coverlid for the dough transfer device which is operable so that in use, when the dough transfer device is moved into an appropriate position at the cleaning station, the coverlid is secured onto the dough transfer device and cleaning fluid emerges under pressure from the spray nozzle so as to clean the dough transfer device.

18. The dough dispensing apparatus as claimed in claim 17, wherein the cleaning station includes means for locating the coverlid onto the dough transfer device and said locating means includes a pneumatic piston.

19. A system for dispensing dough, the system comprising a container for receiving and holding dough, a dough transfer device for receiving dough from said container and for transferring said dough to a depositing station at which the dough is deposited onto a conveying means, the dough transfer device including a conical-shaped bottom profile and including a scraper device which is fixedly attached to a holding member such that in use, when dough is contained in the dough transfer device, motion of the dough with respect to the scraper device occurs to prevent dough from adhering to an inner side wall of the dough transfer device, the scraper device being generally arcuate in profile thereby enabling the dough to be dispensed homogenously from a bottom of the dough transfer device, while simultaneously not adding significantly to the mixing of the dough in the dough transfer device, which would otherwise lead to overmixing of the dough.

20. The system as claimed in claim 19, wherein the container is movable along a first longitudinal framework track and the dough transfer device is moveable along a second longitudinal framework track, the dough transfer device being movable to deposit dough at one or more depositing stations.

21. The system as claimed in claim 19, wherein the system includes means for mixing dough during a dough mixing and preparation process and means for loading dough into the container.

22. The system as claimed in claim 21, wherein the mixing of the dough is carried out in a mixing room and the environment in the mixing room is controlled so that the temperature in the room is maintained at a constant temperature.

23. The system as claimed in claim 22, wherein in the mixing room, water is added to the dough ingredient(s) in a hydration step in the dough mixing and preparation process.

24. The system as claimed in claim 23, wherein the dough mixing and preparation process includes a further step of allowing the mixed dough to rest for a specified predetermined length of time to enable further hydration of ingredients to occur.

25. The system as claimed in claim 24, wherein the pre-determined rest period is 5 to 10 minutes in duration.

26. The system as claimed in claim 22, wherein the system includes means for moving the container, loaded with dough, from the mixing room to a cooking room where subsequent processing steps are carried out on the dough.

27. The system as claimed in claim 26, wherein the system includes separating means for separating the mixing room from the cooking room so that the controlled environment of the mixing room is kept intact.

28. The system as claimed in claim 27, wherein the separating means includes a slideable door which is slideably moveable between a closed position in which the slideable door is effective for separating the mixing room from the cooking room and an open position in which the container can be moved along the first longitudinal framework track from the mixing room to the cooking room.

29. The system as claimed in claim 26, wherein the system includes elevating means for elevating the container into a raised position, in which raised position the container can be tilted so that dough held in the container can be poured downwardly into the dough transfer device.

30. The system as claimed in claim 29, wherein the elevating means for elevating the container includes an elevator device which is inclined at an angle to the vertical; the elevator device including means for gripping and holding the container as it is moved along the inclined axis of the elevator device and means for tipping the container over so that in use, the dough held in the container can flow downwardly into the dough transfer device.

31. The system as claimed in claim 30, wherein the elevator device is located in the cooking room and the container passes through the slideable door before being engaged with the elevator device.

32. The system as claimed in claim 19, wherein the dough transfer device is rotatable about its longitudinal axis and in use, the dough transfer device is rotated about its longitudinal axis so as to result in motion of dough in the dough transfer device with respect to said scraper device.

33. The system as claimed in claim 19, wherein the system for dispensing dough also includes a cleaning station for cleaning the dough transfer device, the cleaning station being adapted to receive the dough transfer device and including a nozzle for spraying a jet of cleaning fluid to clean the inside of the dough transfer device.

34. The system as claimed in claim 33, wherein the cleaning station includes a coverlid for the dough transfer device which is operable so that in use, when the dough transfer device is moved into an appropriate position at the cleaning station, the coverlid is secured onto the dough transfer device and cleaning fluid emerges under pressure from the spray nozzle so as to clean the dough transfer device.

35. The system as claimed in claim 34, wherein the cleaning station includes means for locating the coverlid onto the dough transfer device and preferably said means includes a pneumatic piston.

* * * * *

UNITED STATES PATENT AND TRADEMARK OFFICE
CERTIFICATE OF CORRECTION

PATENT NO. : 7,328,652 B2
APPLICATION NO. : 10/611462
DATED : February 12, 2008
INVENTOR(S) : Ronan McNamee Page 1 of 1

It is certified that error appears in the above-identified patent and that said Letters Patent is hereby corrected as shown below:

On the title page, change (73) Assignee "Irish Baker Inventions Limited (IR)" to --Irish Bakery Inventions Limited (IE)--.

Signed and Sealed this

Eighth Day of July, 2008

JON W. DUDAS
*Director of the United States Patent and Trademark Office*